US009457903B2

(12) United States Patent
Moje et al.

(10) Patent No.: US 9,457,903 B2
(45) Date of Patent: Oct. 4, 2016

(54) MODIFIABLE AIRCRAFT MONUMENT

(71) Applicant: Airbus Operations GmbH, Hamburg (DE)

(72) Inventors: Sabrina Moje, Rosengarten (DE); Matthias Breuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 218 days.

(21) Appl. No.: 14/277,304

(22) Filed: May 14, 2014

(65) Prior Publication Data

US 2014/0339360 A1    Nov. 20, 2014

(30) Foreign Application Priority Data

May 15, 2013    (DE) .................. 10 2013 008 309

(51) Int. Cl.
| | |
|---|---|
| *B64D 11/00* | (2006.01) |
| *B64D 13/00* | (2006.01) |
| *B64D 11/02* | (2006.01) |
| *B64D 11/04* | (2006.01) |

(52) U.S. Cl.
CPC .............. *B64D 11/00* (2013.01); *B64D 11/02* (2013.01); *B64D 11/04* (2013.01); *B64D 2011/0046* (2013.01)

(58) Field of Classification Search
CPC ....... B64D 11/00; B64D 11/02; B64D 11/04; B64D 2011/0046; B64D 22/0023
See application file for complete search history.

(56) References Cited

U.S. PATENT DOCUMENTS

| | | | | |
|---|---|---|---|---|
| 2,650,368 | A | * | 9/1953 | Evans .................... B64D 11/02 312/304 |
| 6,007,025 | A | | 12/1999 | Coughren et al. |
| 6,604,709 | B1 | | 8/2003 | Wentland et al. |
| 6,615,421 | B2 | | 9/2003 | Itakura |
| 7,780,114 | B2 | | 8/2010 | Doebertin et al. |
| 9,120,572 | B2 | * | 9/2015 | Wilkinson ............. B64D 11/00 |
| 2005/0241062 | A1 | | 11/2005 | Quan |

(Continued)

FOREIGN PATENT DOCUMENTS

| | | |
|---|---|---|
| DE | 102006023047 | 11/2007 |
| DE | 102010012989 | 9/2011 |
| DE | 102011109390 | 2/2013 |
| EP | 0850833 | 7/1998 |
| EP | 1209078 | 5/2002 |

(Continued)

OTHER PUBLICATIONS

German Search Report, May 15, 2013.

*Primary Examiner* — Philip J Bonzell
(74) *Attorney, Agent, or Firm* — Greer, Burns & Crain Ltd.

(57) ABSTRACT

An aircraft monument for installation in an aircraft cabin comprising a first functional module, a second functional module and a side wall for delimiting the first module from at least one of a region of the aircraft cabin adjacent to the first module and a region of the aircraft monument adjacent to the first module. The side wall is movable between a first and a second operational position and comprises a first side-wall region separating the first and second functional modules and in the second operational position, the side wall is displaced in the direction of the second module relative to its position in the first operational position, so that a movement of the side wall from its first operational position into its second operational position results in an enlargement of a base area of the first module and a corresponding diminution of a base area of the second module.

20 Claims, 3 Drawing Sheets

(56) References Cited

U.S. PATENT DOCUMENTS

2009/0261200 A1   10/2009   Saint-Jalmes et al.
2013/0240669 A1*  9/2013   Wilkinson ............. B64D 11/00
                                                 244/118.5

FOREIGN PATENT DOCUMENTS

| | | |
|---|---|---|
| EP | 1338508 | 8/2003 |
| WO | 2011116982 | 9/2011 |
| WO | 2013017290 | 2/2013 |

\* cited by examiner

MODIFIABLE AIRCRAFT MONUMENT

CROSS-REFERENCES TO RELATED APPLICATIONS

This application claims the benefit of the German patent application No. 10 2013 008 309.5 filed on May 15, 2013, the entire disclosures of which are incorporated herein by way of reference.

BACKGROUND OF THE INVENTION

The invention relates to an aircraft monument provided for installation in an aircraft cabin, and also to an aircraft region including an aircraft monument of such a type. The invention further relates to a process for operating an aircraft equipped with an aircraft monument of such a type and/or with an aircraft region of such a type.

Modern commercial aircraft usually are equipped with on-board kitchens, so-called galleys, which are known, for example, from DE 10 2006 023 047 B4 or U.S. Pat. No. 7,780,114 B2. As a rule, the galleys are installed in the door-entry regions of the aircraft cabin and comprise a body with a substantially rectangular outline, which is oriented parallel to a door aisle extending in the direction of an aircraft door. Via the door aisle, which extends substantially perpendicular to a main aisle running along a longitudinal axis of the aircraft cabin, passengers can get out of the aircraft or into the aircraft.

Furthermore, from DE 10 2011 109 390 A1 or WO 2013/017290 A1 an aircraft monument for installation in an aircraft cabin is known which comprises a sanitary module with a sanitary device and also a kitchen module arranged adjacent to the sanitary module. The kitchen module comprises a trolley parking space and also a working surface, the trolley parking space being separated from the sanitary module by a partition. The aircraft monument described in DE 10 2011 109 390 A1 or WO 2013/017290 A1 enables the installation space requirement of an on-board kitchen in an aircraft cabin to be diminished without impeding the handling of trolleys filled with service products for the cabin personnel, and is, in particular, suitable for installation in aircraft that are employed on short-haul flights pertaining to the lower price range, on which merely a reduced service is offered to the passengers.

Lastly, DE 10 2010 012 989 A1 or WO 2011/116982 A2 proposes to equip a sanitary module, provided for installation in an aircraft cabin, in its interior space with a first trolley parking place for accommodating at least one trolley that is suitable for receiving supplies for the passengers in the aircraft cabin, in the interior space of the sanitary module. Furthermore, a second trolley parking place is provided adjacent to the sanitary module. During take-off and during landing, i.e., during the flight phases in which the sanitary module is not available to the passengers for use anyway for reasons of safety, the first trolley parking place in the interior space of the sanitary module can be utilized for accommodating one or more trolleys. If the aircraft is, on the other hand, at cruising altitude, the second trolley parking place is available for accommodating the trolley(s).

SUMMARY OF THE INVENTION

An object underlying the invention is to specify an aircraft monument that enables an optimal exploitation of the space available in an aircraft cabin in various operational phases of the aircraft. Furthermore, the object underlying the invention is to make available an aircraft region equipped with an aircraft monument of such a type. Lastly, the invention is directed towards the object of specifying a process for operating an aircraft equipped with an aircraft monument of such a type and/or with an aircraft region of such a type.

An aircraft monument provided for installation in an aircraft cabin comprises a first functional module and a second functional module. The first functional module is equipped with a side wall that is adapted to delimit the first functional module from a region of the aircraft cabin adjacent to the first functional module and/or from a region of the aircraft monument adjacent to the first functional module. By virtue of the side wall of the first functional module, a base area of the first functional module is consequently defined. The side wall is movable between a first and a second operational position and comprises a side-wall region which separates the first functional module from the second functional module and in the second operational position of the side wall is displaced in the direction of the second functional module relative to its position in the first operational position of the side wall. By virtue of this configuration of the side wall of the first functional module, a movement of the side wall out of its first operational position into its second operational position results in an enlargement of a base area of the first functional module and in a corresponding diminution of a base area of the second functional module. The total base area of the aircraft monument, on the other hand, does not change.

The aircraft monument consequently comprises a first and a second functional module, the base areas of which can, as needed, be varied in straightforward manner by movement of the side wall of the first functional module. In operational phases of the aircraft in which, for example for reasons of comfort, a larger base area of the first functional module is desired and at the same time a correspondingly smaller base area of the second functional module is acceptable, the first functional module can consequently be utilized with its larger base area. On the other hand, in operational phases of the aircraft in which a correspondingly large base area of the second functional module is desirable or required, a utilization of the first functional module with diminished base area is possible.

The base area of the first functional module preferably is selected in such a way that the first functional module can be utilized even when the side wall of the first functional module is in its first operational position. A greater ease of use is, however, obtained by virtue of the enlarged base area of the first functional module when the side wall of the first functional module is in its second operational position. The total base area of the aircraft monument remains the same in this case, so that it is always guaranteed that a region of the aircraft cabin that, for example for reasons of safety, is to be kept vacant is not impaired. The aircraft monument consequently enables an optimal exploitation of the space available in the aircraft cabin in various operational phases of the aircraft.

The side wall of the first functional module may comprise a second side-wall region which merely in the second operational position of the side wall serves for delimiting the first functional module from a region of the aircraft cabin adjacent to the first functional module. If the side wall is in its first operational position, the second side-wall region may, on the other hand, be arranged inside or outside the first functional module in such a way that it is not suitable for delimiting the first functional module from a region of the aircraft cabin adjacent to the first functional module. Alternatively or in addition to this, the side wall of the first functional module may comprise a third side-wall region which merely in the second operational position of the side wall serves for delimiting the first functional module from a region of the aircraft monument adjacent to the first functional module. If the side wall is in its first operational position, the third side-wall region may, on the other hand, be arranged inside or outside the first functional module in such a way that it is not suitable for delimiting the first functional module from a region of the aircraft monument adjacent to the first functional module.

The second and/or the third side-wall region may, in the event of a movement of the side wall out of its first into its second operational position by swiveling, swinging, twisting, unfolding or such like, be brought into a position in which it/they is/are suitable to delimit the first functional module from a region of the aircraft cabin and/or of the aircraft monument adjacent to the first functional module. This can be brought about particularly easily if the second and/or third side-wall region includes a flexible material, in particular a foldable material. Over and above this, a second and/or third side-wall region consisting of a flexible material, in particular a foldable material, has a merely smaller space requirement if the side wall of the first functional module is in its first operational position.

In principle, the first functional module of the aircraft monument may be designed in the form of an arbitrary module, for example a kitchen module or a stowage-compartment module. However, the first functional module preferably is configured in the form of a sanitary module. The sanitary module may be equipped with a toilet and with further sanitary devices such as, for example, a washbasin with a water tap, a mirror and/or a cupboard for accommodating toilet paper, paper towels etc. In the side wall of the first functional module a doorway that is capable of being closed by a door may be formed, in order to make the interior space of the first functional module accessible. The door may be designed in the form of a sliding door or may be capable of being swiveled between an open position and a closed position about a swivel axis which may be anchored in the region of a floor of the aircraft monument and/or in the region of a floor of an aircraft cabin equipped with the aircraft monument.

During take-off, landing and taxiing of an aircraft equipped with the aircraft monument, i.e., during the flight phases in which a sanitary module is not available to the passengers for use anyway for reasons of safety, the side wall of a first functional module configured in the form of a sanitary module may then be in its first operational position, so that the first functional module merely occupies a minimal base area. If the aircraft is, on the other hand, in cruise flight, the first functional module may be available with an enlarged base area for more comfortable utilization.

Similarly, the second functional module may be designed in the form of an arbitrary module. The second functional module, however, preferably is designed in the form of a kitchen module or a stowage-compartment module. The combination of various modalities in a single aircraft monument enables a centralization of systems, for example the centralization of supply systems needed for supplying the aircraft monument. As a result, an autarkic aircraft monument can be realized, in which the various functional regions can be connected up, for example via common ports, to a central water-supply system, a central power-supply system and/or a central sewage-disposal system of the aircraft.

During take-off, landing and taxiing of an aircraft equipped with the aircraft monument, the side wall of the first functional module may be in its first operational position, so that the first functional module occupies merely a minimal base area but the second functional module designed in the form of a kitchen module or a stowage-compartment module has a larger base area. The second functional module then offers sufficient stowage space for trolleys and other devices that have to be stowed securely during take-off, landing and taxiing of the aircraft. If the aircraft is in cruise flight, trolleys and other devices may, on the other hand, be taken out of the second functional module and be utilized or accommodated elsewhere, so that the base area of the second functional module can be diminished without losses of function.

The aircraft monument may comprise a substantially circular, square or rectangular base area. Preferably, however, the aircraft monument has an oval base area. The first functional module may comprise an elliptical-segment-shaped base area. The base area of the first functional module preferably retains its elliptical-segment shape if the side wall of the first functional module is moved between its first operational position and its second operational position. The second functional module may, on the other hand, comprise a rectangular base area. The base area of the second functional module preferably also retains its rectangular shape if the side wall of the first functional module is moved between its first operational position and its second operational position—merely a length and/or a width of the base area of the second functional module can be varied in the event of a movement of the side wall of the first functional module between its first operational position and its second operational position.

The side wall of the first functional module may be movable between its first and its second operational position by displacement of the first side-wall region, appropriate positioning of the second side-wall region, and connecting of the second side-wall region to a fourth side-wall region expanded in the second operational position of the side wall by the second side-wall region. The first functional module may be equipped with a first connecting arrangement, designed for example in the form of a suitable latching arrangement, which serves in the second operational position of the side wall to establish a connection between the second side-wall region and the fourth side-wall region expanded in the second operational position of the side wall by the second side-wall region.

Alternatively or in addition to this, the side wall of the first functional module may be movable between its first and its second operational position by displacement of the first side-wall region, appropriate positioning of the third side-wall region, and connecting of the third side-wall region to a fifth side-wall region expanded in the second operational position of the side wall by the third side-wall region. Correspondingly, the first functional module may then be equipped with a second connecting arrangement, designed for example in the form of a suitable latching arrangement, which serves in the second operational position of the side wall to establish a connection between the third side-wall region and the fifth side-wall region expanded in the second operational position of the side wall by the third side-wall region.

The aircraft monument preferably includes at least two first functional modules, which do not necessarily have to serve for the same function but each are equipped with a side wall that is movable between a first and a second operational position, and consequently have a variable base area. If a first functional module is designed in the form of a sanitary module, a further first functional module may accordingly be configured also in the form of a kitchen module, a stowage-compartment module or such like, with a side wall that is movable between a first and a second operational position.

The two first functional modules preferably are arranged adjacent to one another in such a manner that they are separated from one another by a partition which in the first operational position of the respective side walls of the first functional modules is formed by the fifth side-wall region of one of the two first functional modules. In the second operational position of the respective side walls of the first functional modules, a partition extending between the two first functional modules may, on the other hand, be formed by the third and the fifth side-wall region of one of the two first functional modules. Such a configuration of the aircraft monument has the advantage that merely an expandable partition for both first functional modules has to be provided, as a result of which a lightweight design of the aircraft monument becomes possible.

The aircraft monument may furthermore include a third functional module which, for example, may be designed in the form of a sanitary module, a kitchen module or a stowage-compartment module but differs from the first and the second functional module by virtue of the fact that it comprises no side wall that is movable between a first and a second operational position, and consequently also does not have a variable base area. The first and the third functional module may be arranged in the region of portions of the aircraft monument situated substantially opposite one another. Furthermore, the first and the third functional module may be separated from one another by the second functional module.

Lastly, it is conceivable that the aircraft monument includes at least two third functional modules which, in particular, may be arranged adjacent to one another and may be separated from the first functional module by the second functional module. For example, the aircraft monument may then comprise a central region formed by the second functional module, which on sides situated substantially opposite one another adjoins a pair of first functional modules and a pair of third functional modules.

An aircraft region includes at least one main aisle extending along a longitudinal axis of an aircraft cabin. The at least one main aisle may, for example, separate two passenger-seat regions of the aircraft cabin from one another, in which case each passenger-seat region may comprise a plurality of rows of passenger seats arranged one behind the other, each with three passenger seats. Specifically, the aircraft region may include only one main aisle. It is, however, also conceivable that the aircraft region comprises more than one main aisle, e.g., two main aisles which may extend substantially parallel to each other along and/or parallel to a longitudinal axis of an aircraft cabin. Furthermore, the aircraft region includes a door aisle which extends substantially perpendicular to the main aisle between a first and a second aircraft door. An aircraft monument described above is arranged in the door aisle. By virtue of the arrangement of the aircraft monument in the door aisle, a hitherto unutilized region of the aircraft cabin is utilized for monument installation. The installation space that is utilized in conventional aircraft-cabin layouts for installation of a sanitary module, of a kitchen module and/or of a stowage-compartment module may consequently be utilized otherwise, for example for additional passenger seats.

The aircraft region preferably includes at least one parking place which is adapted to receive, at least in certain operational phases of an aircraft equipped with the aircraft region, a mobile component of the second functional module. The mobile component may be, for example, a trolley or a stowage-compartment element which, for example during cruise flight of an aircraft equipped with the aircraft region, can be removed from the second functional module, so that the base area of the second functional module can be diminished without losses in the function of the second functional module. The parking place may be provided with a fastening device which is adapted to fix the mobile component of the second functional module in its position on the parking place.

In particular in case the aircraft region comprises only one main aisle, the aircraft monument preferably is arranged in the door aisle in such a manner that at least a first or a third functional module faces towards a front region of the aircraft cabin, relative to the flight direction of an aircraft equipped with the aircraft region. Alternatively or in addition to this, the aircraft monument may also be arranged in the door aisle of an aircraft region comprising only one main aisle in such a manner that at least a first or a third functional module faces towards a rear region of the aircraft cabin, relative to the flight direction of an aircraft equipped with the aircraft region. In case the aircraft region comprises more than one main aisle, the aircraft monument may be arranged in the door aisle in such a manner that at least a first or a third functional module faces towards an aircraft door.

The aircraft monument preferably is arranged substantially centrically in the door aisle. Such an arrangement of the aircraft monument enables the aircraft monument to be utilized as part of a guiding system for emergency evacuations. In particular, the aircraft monument may perform a guidance function for persons moving along the main aisle(s) in the direction of the aircraft doors, since the persons are necessarily led along the outer walls of the aircraft monument in the direction of the aircraft doors. In the event of an emergency evacuation of the aircraft, this enables an increase in the door capacity, i.e., an increase in the number of persons who are able to leave the aircraft via the doors of the aircraft per unit of time.

In a process for operating an aircraft equipped with an aircraft monument described above and/or with an aircraft region described above, the side wall of the first functional module is in its first operational position during take-off, landing and taxiing. As a result, the space requirement of the first functional module can be minimized, and the space becoming vacant thereby can be utilized for an enlargement of the base area of the second functional module. During cruise flight the side wall of the first functional module is, on the other hand, in its second operational position. By reason of the enlarged base area of the first functional module, this enables a particularly comfortable utilization of the first functional module.

In particular during take-off, landing and taxiing, the stowage space of the second functional module, which is enlarged by the positioning of the side wall of the first functional module in its first operational position, can be utilized for the accommodation of a mobile component of the second functional module. During cruise flight, on the other hand, a mobile component of the second functional module can be accommodated on a parking place of the aircraft region, which is located, in particular, in a door-entry region of the aircraft region.

BRIEF DESCRIPTION OF THE DRAWINGS

Preferred embodiments of the invention will now be elucidated in more detail on the basis of the appended schematic drawings, in which.

DETAILED DESCRIPTION OF THE PREFERRED EMBODIMENTS

Figure 1:
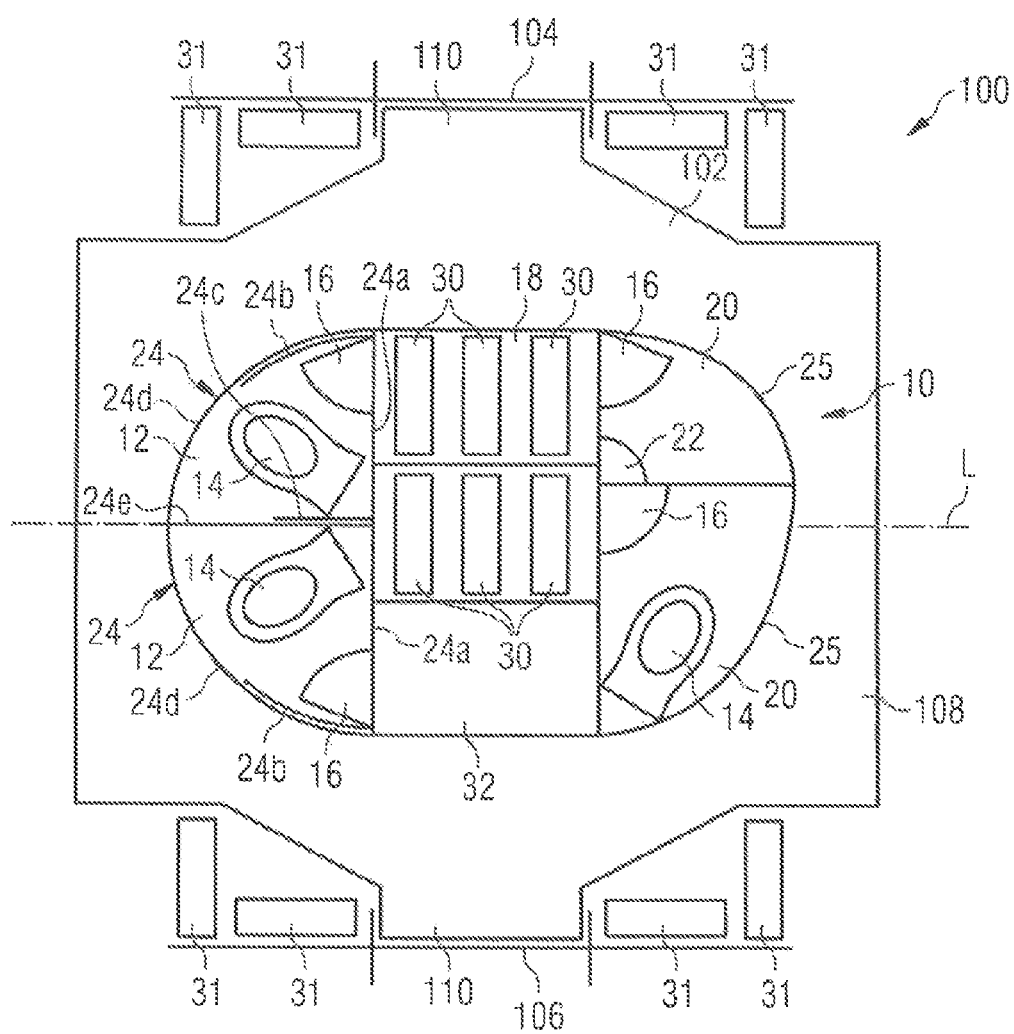
FIG. 1 shows a top view of an aircraft region in which an aircraft monument comprising a first and a second functional module and also a third functional module is arranged, wherein a side wall of the first functional module is in a first operational position.
Figure 2:
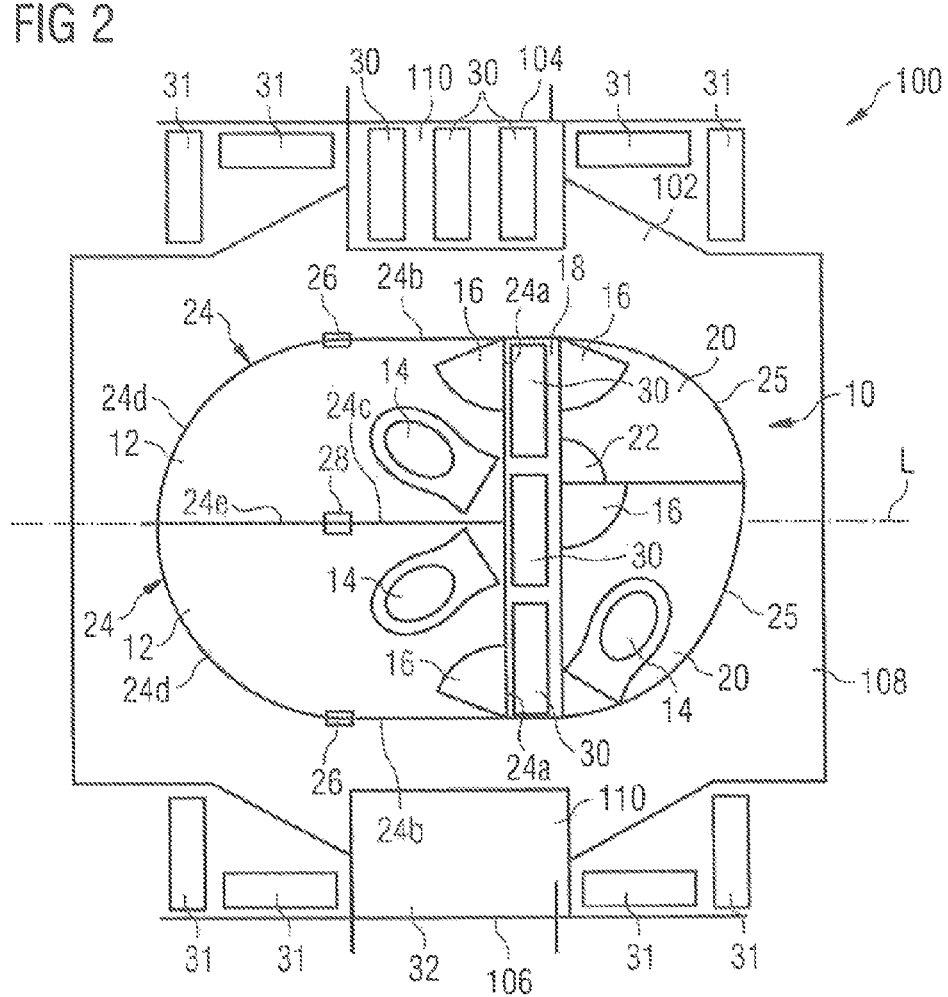
FIG. 2 shows a top view of the aircraft region according to FIG. 1, wherein a side wall of the first functional module is in a second operational position
Figure 3:
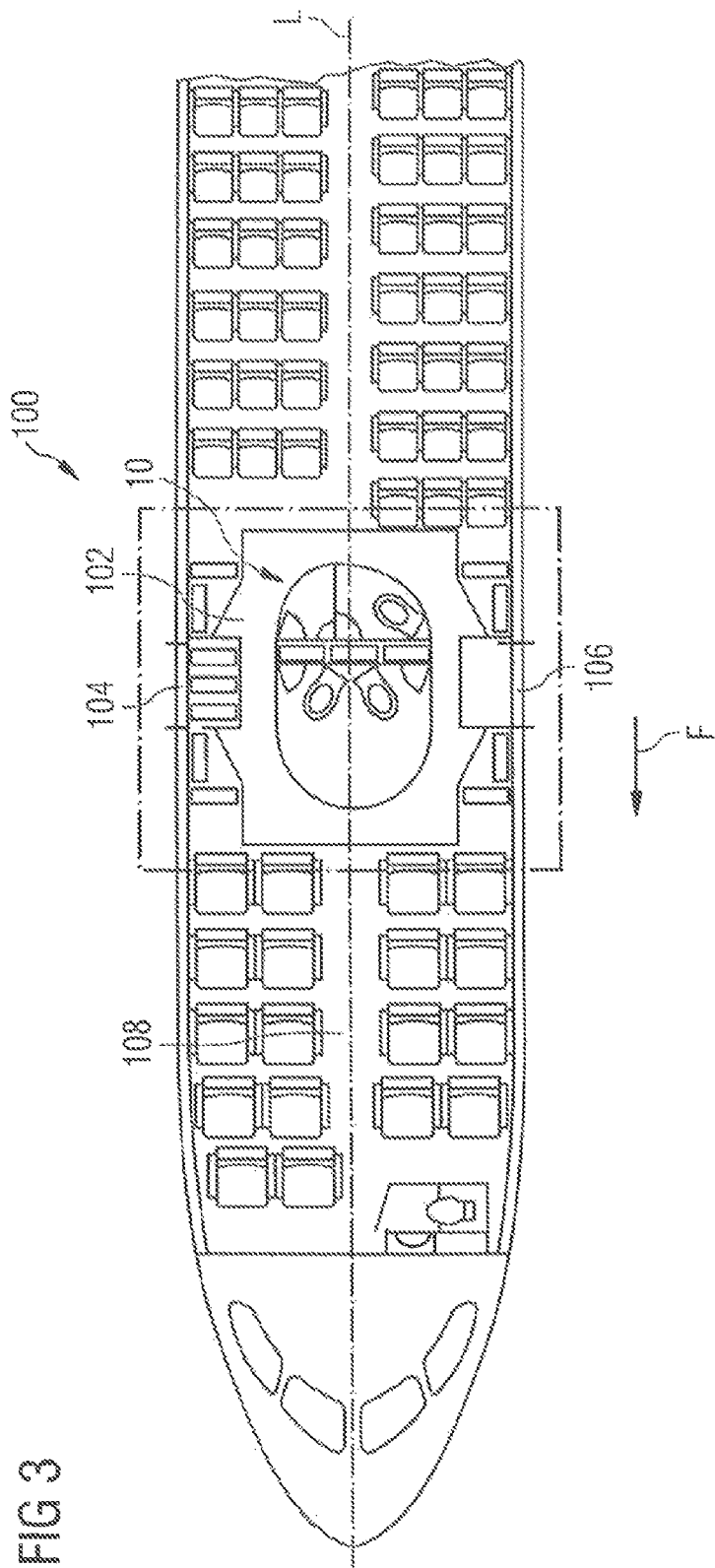
FIG. 3 shows a general representation of an aircraft region according to FIG. 2.

FIGS. 1 to 3 each show an aircraft region 100 which is formed by a part of an aircraft cabin. In the aircraft region 100 an aircraft monument 10 is arranged. The aircraft monument 10 includes two first functional modules 12 which are designed in the form of a sanitary module and comprise a toilet 14 and also further sanitary devices, in particular a washbasin 16. Over and above this, the aircraft monument 10 includes a centrally positioned second functional module 18 designed in the form of a stowage-compartment module.

Along a longitudinal axis L of the aircraft cabin in a first direction the two first functional modules 12 adjoin the second functional module 18. Along the longitudinal axis L of the aircraft cabin in a second direction, opposite to the first direction, on the other hand, two third functional modules 20 adjoin the second functional module 18, one of which is designed in the form of a sanitary module with a toilet 14 and with a washbasin 16, and one in the form of a sanitary module with diminished functionality, with a urinal 22 and with a washbasin 16. In the aircraft monument 10 the pairs of first and third functional modules 12, 20 are consequently arranged in the region of portions of the aircraft monument 10 situated substantially opposite one another and are separated from one another by the second functional module 18 constructed in the form of a stowage-compartment module.

Each first functional module 12 includes a side wall 24 which serves to delimit the first functional module 12 from a region of the aircraft cabin adjacent to the first functional module 12 and also from a region of the aircraft monument 10 adjacent to the first functional module 12. The region of the aircraft monument 10 adjacent to the first functional module 12 is formed, in the embodiment of an aircraft monument 10 that is shown, in each instance by a region of the second functional module 18 adjacent to the first functional module 12 and also by the further first functional module 12 adjacent to the first functional module 12.

As becomes evident, in particular, from a comparison of FIGS. 1 and 2, the side wall 24 of each first functional module 12 is movable between a first operational position (see FIG. 1) and a second operational position (see FIGS. 2 and 3) and comprises a side-wall region 24a which separates the first functional module 12 from the second functional module 18 and in the second operational position of the side wall 24 is displaced in the direction of the second functional module 18 relative to its position in the first operational position of the side wall 24. Side-wall region 24a of the first functional module 12 represented at the top in the Figures may be designed to be integral with side-wall region 24a of the first functional module 12 represented at the bottom in the Figures. However, a separate configuration of side-wall regions 24a of the two first functional modules 12 is also conceivable. A movement of the side wall 24 out of its first operational position into its second operational position results in an enlargement of the base area of each first functional module 12 and also in a corresponding diminution of a base area of the second functional module 18. The total base area of the aircraft monument 10, on the other hand, does not change.

In contrast to the side walls 24 of the first functional modules 12, side walls 25 of the third functional modules 20 in the embodiment of an aircraft monument 10 that is shown in the Figures are not movable between a first and a second operational position. The base area of the third functional modules 20 is consequently not variable.

The aircraft monument 10 has an oval base area. Each of the first functional modules 12 has, irrespective of the operational position of the side wall 24, an elliptical-segment-shaped base area. On the other hand, the second functional module 18 comprises, irrespective of the operational position of the side wall 24, a rectangular base area. The base area of the two third functional modules 20 has an elliptical-segment shape. The base areas of the first functional modules 12 are selected in such a way that the first functional modules 12, each designed in the form of a sanitary module, can be utilized also when the side wall 24 of the first functional modules 12 is in its first operational position. By virtue of the enlarged base area of the first functional modules 12, however, a greater ease of use is obtained if the side walls 24 of the first functional modules 12 are in their second operational position.

The side wall 24 of each first functional module 12 further comprises a second side-wall region 24b which merely in the second operational position of the side wall 24 serves for delimiting the first functional module 12 from a region of the aircraft cabin adjacent to the first functional module 12. If the side wall 24 is in its first operational position, the second side-wall region 24b is, on the other hand, arranged in an interior space of the first functional module 12, so that it is not suitable for delimiting the first functional module 12 from a region of the aircraft cabin adjacent to the first functional module 12. In the embodiment of an aircraft monument 10 shown in the Figures, the second side-wall region 24b consists of a flexible material, in particular a foldable material. As a result, the second side-wall region 24b can be stowed in space-saving manner in the interior space of the first functional module 12.

Over and above this, the side wall 24 of the first functional module 12 represented at the top in the Figures comprises a third side-wall region 24c consisting of a flexible material, in particular a foldable material, which merely in the second operational position of the side wall 24 serves for delimiting the first functional module 12 represented at the top in the Figures from a region of the aircraft monument 10 adjacent to the first functional module 12, which in the embodiment of an aircraft monument 10 shown in the Figures is formed by the first functional module 12 represented at the bottom in the Figures. If the side wall 24 of the first functional module 12 represented at the top in the Figures is in its first operational position, the third side-wall region 24c is stowed within the first functional module.

In order to move the side wall 24 of the two first functional modules 12 out of its first into its second operational position, the first side-wall region 24a is displaced out of its position illustrated in FIG. 1 in the direction of the second functional module 18 into its position shown in FIGS. 2 and 3. Subsequently each second side-wall region 24b is positioned appropriately and connected by means of a first connecting arrangement 26, designed for example in the form of a suitable latching arrangement, to a fourth side-wall region 24d expanded in the second operational position of the side wall 24 by the second side-wall region 24b. Furthermore, the third side-wall region 24c of the first functional module 12 represented at the top in the Figures is positioned appropriately and connected by means of a second connecting arrangement 28, designed for example likewise in the form of a suitable latching arrangement, to a fifth side-wall region 24e expanded in the second operational position of the side wall 24 by the third side-wall region 24c.

The two first functional modules 12 of the aircraft monument 10 are arranged adjacent to one another in such a manner that they are separated from one another by a partition which in the first operational position of the respective side walls 24 of the first functional modules 12 is formed by the fifth side-wall region 24e of the first functional module 12 represented at the top in the Figures. In the second operational position of the respective side walls 24 of the first functional modules 12 the partition extending between the two first functional modules 12 is, on the other hand, formed by the third and the fifth side-wall region 24c, 24e of the first functional module 12 represented at the top in the Figures. The side wall 24 of the first functional module 12 represented at the bottom in the Figures consequently comprises no third or fifth side-wall region, as a result of which a lightweight design of the aircraft monument 10 becomes possible.

The aircraft monument 10 is arranged in the aircraft region 100 centrically in a door aisle 102 which extends between a first and a second aircraft door 104, 106 and substantially perpendicular to a main aisle 108 running along a longitudinal axis L of the aircraft cabin. The door aisle 102 consequently separates a front part of the aircraft cabin from a rear part of the aircraft cabin, viewed in the flight direction F. The aircraft monument 10 arranged centrically in the door aisle 102 is consequently arranged between the front and the rear part of the aircraft cabin, with the first functional modules 12 facing towards the front part of the aircraft cabin, and the third functional modules 20 facing towards the rear part of the aircraft cabin. In case the aircraft monument 10 should be arranged in an aircraft region 100 which comprises more than one main aisle 108, e.g., two main aisles 108 extending parallel to each other along the longitudinal axis L of the aircraft cabin, the aircraft monument 10 may be arranged centrically in the door aisle 102 in such a manner that the first and the third functional modules 12, 20 face the aircraft doors 104, 106.

By virtue of the centric arrangement in the door aisle 102, in the event of an emergency evacuation the aircraft monument 10 performs a guidance function for persons moving along the main aisle 108 in the direction of the aircraft doors 104, 106. In particular, these persons are led along the side walls 24 of the first functional modules 12 and also along side walls 25 of the third functional modules 20 in the direction of the aircraft doors 104, 106.

Depending on the operating condition of an aircraft equipped with the aircraft monument 10 described above or with the aircraft region 100 described above, the side wall 24 of the first functional modules 12 is in its first or its second operational position. During take-off, landing and taxiing of an aircraft equipped with the aircraft monument 10, i.e., during the flight phases in which a sanitary module is not available to the passengers for use anyway for reasons of safety, the side wall 24 of the first functional modules 12 configured in the form of sanitary modules is in its first operational position. As a result, the first functional modules 12 occupy merely a minimal base area, whereas the second functional module 18 configured in the form of a stowage-compartment module has a larger base area and consequently offers sufficient stowage space for trolleys 30, a stowage-compartment element 32 and other devices that have to be stowed securely during take-off, landing and taxiing of the aircraft. Further trolleys 31 are stowed adjacent to the aircraft doors 104, 106 both during take-off, landing and taxiing and in cruise flight of the aircraft.

If the aircraft is, on the other hand, in cruise flight, the side wall 24 of the first functional modules 12 configured in the form of sanitary modules can be brought into its second operational position. The first functional modules 12 are then available with an enlarged base area for more comfortable utilization. Mobile components of the second functional module 18, such as, for example, the trolleys 30 and/or the stowage-compartment element 32, may, on the other hand, be removed from the second functional module 18 and may be utilized or may be accommodated on suitable parking places 110 provided in the aircraft region 100. Consequently the base area of the second functional module 18 can be diminished without losses of function. The parking places 110 are provided in each instance with a fastening device not illustrated in the Figures, which serves to fix a mobile component of the second functional module 18 in its position on the parking place 110.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft monument for installation in an aircraft cabin, comprising:
    a first functional module,
    a further first functional module adjacent to the first functional module,
    a second functional module and
    a side wall for delimiting the first functional module from at least one of a region of the aircraft cabin adjacent to the first functional module and a region of the aircraft monument adjacent to the first functional module,
    wherein the side wall is movable between a first and a second operational position and comprises a first side-wall region which separates the first functional module from the second functional module and in the second operational position of the side wall, the side wall is displaced in the direction of the second functional module relative to its position in the first operational position of the side wall, so that a movement of the side wall out of its first operational position into its second operational position results in an enlargement of a base area of the first functional module and in a corresponding diminution of a base area of the second functional module, and
    wherein the first functional module and the further first functional module are separated from one another by a partition which in the first operational position of the respective side walls of the first functional module and the further first functional module is formed by a fifth side-wall region of the first functional module, and in the second operational position of the respective side walls of the first functional module and the further first functional module by a third and the fifth side-wall region.

2. The aircraft monument according to claim 1, wherein the side wall comprises the third side-wall region which in the second operational position of the side wall serves for delimiting the first functional module from a region of the aircraft monument adjacent to the first functional module.

3. The aircraft monument according to claim 1, wherein the first functional module is configured in the form of a sanitary module.

4. The aircraft monument according to claim 1, wherein the second functional module is configured in the form of one of a kitchen module and a stowage-compartment module.

5. The aircraft monument according to claim 1, wherein the aircraft monument has an oval base area.

6. The aircraft monument according to claim 1, wherein the side wall of the first functional module is movable between its first and its second operational position by displacement of the first side-wall region, appropriate positioning of a second side-wall region, and connecting of the second side-wall region to a fourth side-wall region expanded in the second operational position of the side wall by the second side-wall region, and appropriate positioning of the third side-wall region, and connecting of the third side-wall region to a fifth side-wall region expanded in the second operational position of the side wall by the third side-wall region.

7. The aircraft monument according to claim 1, wherein the aircraft monument includes at least two third functional modules which are arranged adjacent to one another and are separated from the first functional module by the second functional module.

8. The aircraft monument according to claim 1, wherein the side wall comprises a second side-wall region which in the second operational position of the side wall serves for delimiting the first functional module from a region of the aircraft cabin adjacent to the first functional module.

9. The aircraft monument according to claim 8, wherein at least one of the second and the third side-wall region comprises a flexible material.

10. The aircraft monument according to claim 8, wherein the at least one of the second and the third side-wall region comprises a foldable material.

11. The aircraft monument according to claim 1, wherein the aircraft monument includes a third functional module, the first and the third functional modules being arranged in the region of portions of the aircraft monument situated substantially opposite one another.

12. The aircraft monument according to claim 11, wherein the first and the third functional modules are separated from one another by the second functional module.

13. A process for operating an aircraft equipped with an aircraft monument according to claim 1, comprising the steps:
 positioning the side wall of the first functional module is in its first operational position during take-off, landing and taxiing, and
 positioning the side wall of the first functional module is in its second operational position during cruise flight.

14. The process according to claim 13, wherein during take-off, landing and taxiing the stowage space of the second functional module, which is enlarged by the positioning of the side wall of the first functional module in its first operational position, is utilized for the accommodation of a mobile component of the second functional module, and wherein during cruise flight a mobile component of the second functional module is accommodated on a parking place of the aircraft region.

15. An aircraft region, comprising:
 at least one main aisle extending in the direction of a longitudinal axis of an aircraft cabin,
 a door aisle extending substantially perpendicular to the at least one main aisle between a first and a second aircraft door, and
 an aircraft monument arranged in the door aisle, the aircraft monument comprising:
 a first functional module,
 a further first functional module adjacent to the first functional module,
 a second functional module and
 a side wall for delimiting the first functional module from at least one of a region of the aircraft cabin adjacent to the first functional module and a region of the aircraft monument adjacent to the first functional module,
 wherein the side wall is movable between a first and a second operational position and comprises a first side-wall region which separates the first functional module from the second functional module and in the second operational position of the side wall, the side wall is displaced in the direction of the second functional module relative to its position in the first operational position of the side wall, so that a movement of the side wall out of its first operational position into its second operational position results in an enlargement of a base area of the first functional module and in a corresponding diminution of a base area of the second functional module, and
 wherein the first functional module and the further first functional module are separated from one another by a partition which in the first operational position of the respective side walls of the first functional module and the further first functional module is formed by a fifth side-wall region of the first functional module, and in the second operational position of the respective side walls of the first functional module and the further first functional module by a third and the fifth side-wall region.

16. The aircraft region according to claim 15, further comprising at least one parking place which is adapted to receive, at least in certain operational phases of an aircraft equipped with the aircraft region, a mobile component of the second functional module.

17. The aircraft region according to claim 15, wherein the aircraft monument is arranged in the door aisle in such a manner that at least one of the first or a third functional module faces towards a front region of the aircraft cabin, relative to the flight direction of an aircraft equipped with the aircraft region.

18. The aircraft region according to claim 15, wherein the aircraft monument is arranged in the door aisle in such a manner that at least one of the first or a third functional module faces towards a rear region of the aircraft cabin, relative to the flight direction of an aircraft equipped with the aircraft region.

19. The aircraft region according to claim 15, wherein the aircraft monument is arranged substantially centrically in the door aisle.

20. An aircraft monument for installation in an aircraft cabin, comprising:
 a first functional module,
 a second functional module, and
 a side wall for delimiting the first functional module from at least one of a region of the aircraft cabin adjacent to the first functional module and a region of the aircraft monument adjacent to the first functional module, wherein the side wall is movable between a first and a second operational position and comprises a first side-wall region which separates the first functional module from the second functional module and in the second operational position of the side wall, the side wall is displaced in the direction of the second functional module relative to its position in the first operational position of the side wall, so that a movement of the side wall out of its first operational position into its second operational position results in an enlargement of a base area of the first functional module and in a corresponding diminution of a base area of the second functional module, and wherein the side wall of the first functional module is movable between its first and its second operational position by displacement of the first side-wall region, appropriate positioning of a second side-wall region, and connecting of the second side-wall region to a fourth side-wall region expanded in the second operational position of the side wall by the second side-wall region, and appropriate positioning of a third side-wall region, and connecting of the third side-wall region to a fifth side-wall region expanded in the second operational position of the side wall by the third side-wall region.

* * * * *